Dec. 1, 1936.     O. KALLBERG     2,062,718
FISHING LINE SUBMERGER
Filed Sept. 7, 1935
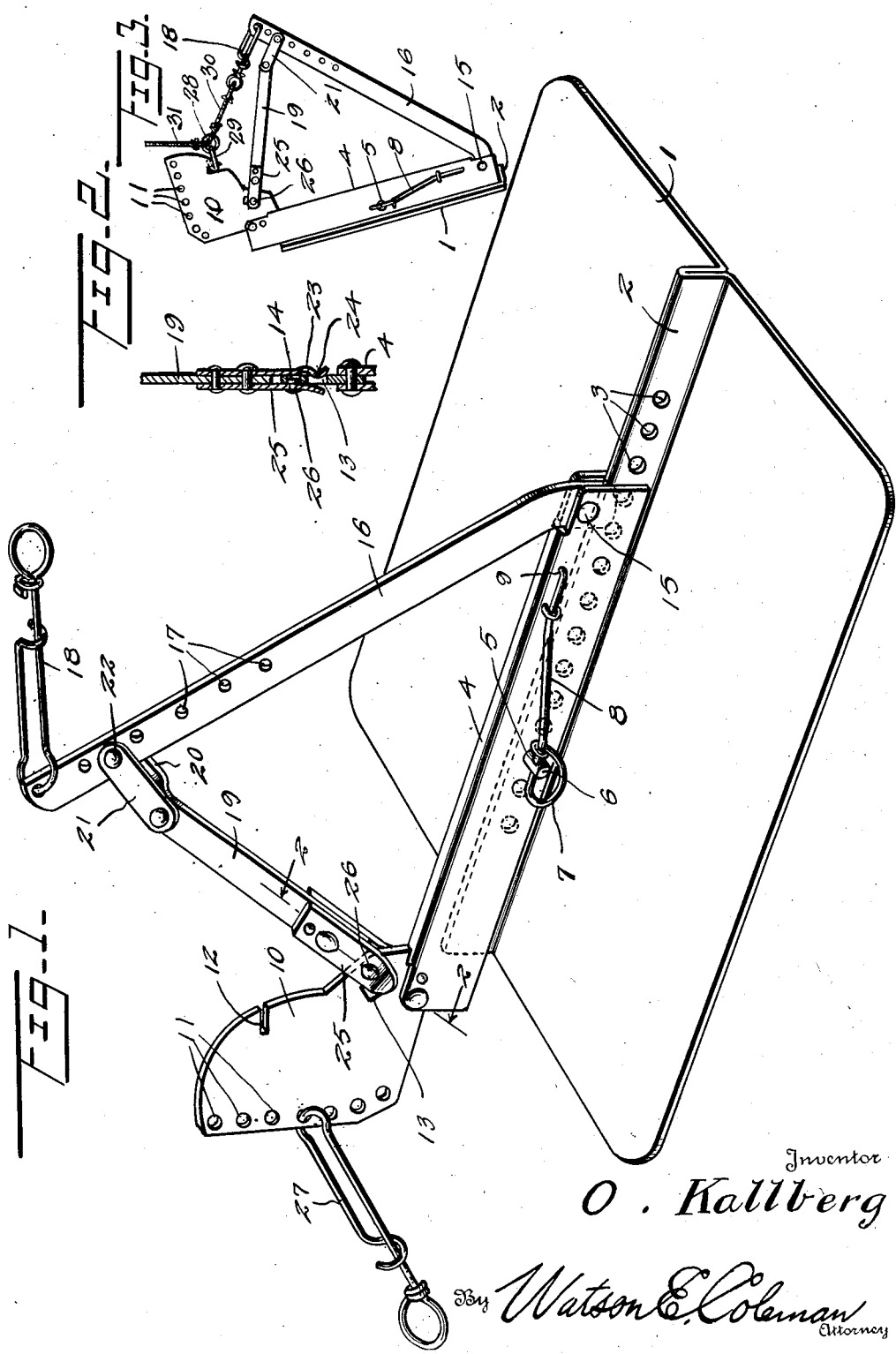
Inventor
O. Kallberg
By Watson E. Coleman
Attorney Patented Dec. 1, 1936

2,062,718

UNITED STATES PATENT OFFICE 2,062,718

FISHING LINE SUBMERGER

Oscar Kallberg, Tacoma, Wash.

Application September 7, 1935, Serial No. 39,653

8 Claims. (Cl. 43—49)

This invention relates to fishing tackle and pertains particularly to a device for use in deep sea fishing.

In deep sea fishing as at present practiced a heavy weight is employed for carrying the hook and line down to the proper depth, such a weight often exceeding twenty-eight pounds. This is necessary in view of the fact that the fishing is done by trolling and if the heavy weight were not employed, the movement of the line through the water would cause the line to straighten out and thus keep the hook at a higher elevation than desired. When a fish is caught the work of pulling the same in is greatly increased because of the excessively heavy sinker which is attached to the line.

The primary object of the present invention is to provide a device which is designed to replace the heavy weight or sinker at present employed and which is effective through the action of dragging the line through the water as in trolling to submerge the line and hook to the proper depth.

Another object of the invention is to provide a submerger which is of an adjustable character whereby the depth to which the line and hook is sunk may be regulated.

Still another object of the invention is to provide a submerger so designed that when a fish is hooked, or any sudden drag is applied to the fishline, certain parts thereof will alter their position so that the bringing of the line, with the submerger and a fish which may be attached thereto, to the surface is made relatively easy.

The invention will be best understood from a consideration of the following detailed description taken in connection with the accompanying drawing forming part of this specification, with the understanding, however, that the invention is not confined to any strict conformity with the showing of the drawing but may be changed or modified so long as such changes or modifications mark no material departure from the salient features of the invention as expressed in the appended claims.

In the drawing:

Figure 1 is a view in perspective of the device embodying the present invention.

Figure 2 is a sectional view taken substantially upon the line 2—2 of Figure 1.

Figure 3 is a view in detail of an attachment for the submerger.

Referring now more particularly to the drawing wherein like numerals of reference indicate corresponding parts throughout the several views, the device comprises a substantially rectangular plate 1 which is formed to provide an upstanding central rib 2 which extends from one edge to the other midway between the lateral edges and which has a plurality of apertures 3 therethrough for the purpose hereinafter described. While this rib 2 has been shown as being formed integral with the plate 1, and it is preferred that it be formed in this manner, it will be obvious that it may constitute a separate piece of material applied to the plate if it is desired to make the device in this manner.

Extending longitudinally of the rib 2 and slidably receiving the same, is an elongated saddle member or slide, which is indicated by the numeral 4, and which as shown is substantially U-shaped in cross section and is provided with a transverse aperture 5 which extends through its two sides, to receive a coupling pin 6 which is loosely attached to the eye member 7 formed at the end of a spring arm 8 which has its other end fixed to the slide 4, as indicated at 9. The pin 6 is designed for selective engagement in the openings 3 of the rib 2 so that the slide may be moved longitudinally on the rib 2 and secured in any desired position thereon to adjust the device to use for a desired depth.

At one end of the slide 4, the rear end of the same and of the submerger, there is fixed between the sides of the slide a corner of a flat, upstanding plate 10, which constitutes a rubber. This plate projects a substantial distance above the slide 4 and has formed therethrough a vertical series of apertures 11 which parallel the vertical rear edge of the rudder, as illustrated. The forward edge of the rudder is curved or rounded from the rear edge and is provided with a slot 12 for the purpose hereinafter set forth.

Adjacent the lower part of the rear edge of the rudder and in relatively close proximity to the slide 4, the rudder is provided with a slot 13 and an aperture 14 located between the slot and the rear edge of the rudder. At the forward end of the slide, there is pivotally attached by the pivot pin 15 between the side walls of the slide, one end of a bar 16 hereinafter referred to as the line post. This post is provided adjacent its free end with the longitudinally extending series of apertures 17 in any one of which the link member 18 may be engaged for the attachment of a line to the device.

The numeral 19 indicates an arm which will be referred to as the let-go arm. One end of this arm is offset as indicated at 20, and extends across one side of the line post 16 while at the opposite side a link 21 is attached at one end to the arm, which has its other end disposed on the opposite side of the line post and the link and arm are pivotally attached thereto by the pin 22. Upon its other end, the arm 19 has fixed thereto a finger 23 which projects beyond the end of the arm and has a transverse rib 24 which is adapted to extend across one side of the rudder plate 10 and engage in the slot 13. On the opposite side of the arm 19, a resilient or spring finger 25 is secured which has an end extending beyond the end of the arm and which carries a button 26 which is adapted to engage in the aperture 14 of the rudder plate.

The numeral 27 indicates a snap link of the same character as that indicated by the numeral 18, by means of which a hook leader is attached to the rudder plate in anyone of the apertures 11.

Figure 3 illustrates the device as used with a special attachment by means of which its rapid submersion is effected. This device consists of a ring 28 to which is attached a hook member 29, and a short length of cord 30. The cord 30 has its other end attached to the clasp 18 and the fishing line is attached to the ring 28. The hook 29 is then engaged in the slot 12 in the manner illustrated so that when the submerger is dropped overboard it will hang in a substantially vertical position from the fishing line and as it is trailed behind the boat the entire area of the top surface will be opposed to the water in the direction of movement of the boat, and thus the body 1 will move downwardly in the water. As it reaches the desired depth it will tend to straighten out, and as it does so the pull of the line 31 will tend to come into line with the slot 12 so that the hook 29 will be released from the slot whereupon the line 31 will then pull directly from the end of the post 16 in the manner previously described.

In the construction of the submerger, it is important that the parts be so designed that when they are assembled the topmost hole 17 in the post 16 will be located substantially five degrees beyond the hole 5 in the slide 4 in the direction of the rear of the device.

In the use of the present submerger the fisherman adjusts the slide 4 upon the rib 2 and attaches the line link 18 in one of the apertures 17 in accordance with the depth to which he wishes the submerger and hook to go. In making this adjustment, allowance is also made for the size of the submerger, the size and length of the line used, and for the weight of the gear used on the back line, also the speed of the boat from which the trolling is being done. When the submerger is cast overboard, the pull of the line upon the link 18 will tip the forward edge of the submerger downwardly and thus cause it to descend rapidly in the water but as it descends and the line gradually forms a sharper angle with the surface of the water, the plate 1 will tend to straighten out until it finally becomes level and will then glide through the water without resistance and at the desired depth. This action is also assisted by the pressure of the water upon the surface of the plate at the rear edge thereof.

As soon as the hook, which is trailing from the link 27, is taken by a fish, the resilient finger 25 will yield and cause the button 26 to slip out of the opening 14 in the rudder 10 so as to release the connection between the end of the arm 19 and the rudder plate. This will permit the line post 16 to swing forwardly on the pivot 15 so that the point of connection between the line and the post 16 will advance beyond the front edge of the plate 1 and will move nearer to the plane of the plate. This will cause the front edge of the plate to point upwardly along the line of the fishing line so that the plate will then tend to move to the surface and this will greatly facilitate the pulling in of the fishing line with the submerger and the hooked fish.

In the event that the fisherman wishes to pull in the submerger without a fish, it is merely necessary for him to give a sharp tug on the line so as to release the engagement of the let-go arm 19 with the rudder 10 whereupon the same action of the plate 1 will occur and the submerger may be easily drawn to the surface.

I claim:—

1. A fishing line submerger comprising a flat plate, a second plate disposed at right angles to the first plate adjacent one edge thereof and constituting a rudder therefor, said rudder being disposed upon a line passing through said first plate midway between two opposite edges thereof, means for attaching a hook to said rudder, a post oscillatably attached to the first plate upon said line, means for attaching a fishing line to said post, and means normally securing said post against movement and adapted to release the member for oscillation relative to the first plate upon the application of sudden strain to the fishing line.

2. A fishing line submerger comprising a plate body having a central rib, a slide engaging said rib and adjustably secured thereto, a rudder element attached to one end of said slide, means for attaching a fish hook to said rudder element, a post oscillatably attached at one end to the other end of the slide, means facilitating the attachment of a fishing line to said post, and a detachable coupling between the post and the rear end of the slide and adapted to release the connection of the post with the slide to permit the post to oscillate relative to the plate.

3. A fishing line submerger comprising a plate member having a central apertured rib, an elongated slide member engaging said rib and adapted to move longitudinally thereon, means carried by the slide member for selective engagement in said apertures, a rudder member carried by the slide and disposed in a plane perpendicular to the plate, means for attaching a hook to said rudder member, a post pivotally attached at one end to the end of the slide remote from the rudder member, means facilitating the attachment of a fishing line to the post, an arm attached at one end to the post, and a strain releasing coupling between the other end of the arm and the rudder member whereby upon the release of the arm under strain said post will oscillate away from the rudder.

4. A fishing line submerger comprising a plate body having a central rib, a slide engaging the rib and adjustably attached thereto, a rudder member attached to said slide at one end and disposed perpendicular to the plate, a post pivotally attached at one end to the other end of the slide, strain-releasing means coupling said post at a point adjacent its other end with the rudder, means for attaching a hook to the rudder, means for attaching a line to said post, and a quick-diving attachment for the submerger comprising a ring member, means for coupling the ring member with the post, and means for detachably coupling the ring with the rudder, said ring being designed to have a fishing line attached thereto and said detachable coupling between the ring and the rudder being such as to release the ring upon the application of a pull thereto from the line from a predetermined direction.

5. A device of the character described, comprising a flat body, a rib extending across one face of the body, means adjustable longitudinally of and on said rib, rudder means at one end of the adjustable means, means for attaching a bait adjacent the rudder means, and means for attaching a line to said adjustable means whereby the line may shift from a normal obtuse angular relation with the body to a substantially parallel relation therewith when a greater than normal strain is applied to the line.

6. A device of the character described, comprising a flat body, a plate forming a rudder disposed on a line running parallel with and between two side edges of the body and occupying a plane perpendicular to the body, means for attaching a hook to said rudder, a post pivotally connected at one end with the body to oscillate in the plane of the rudder, said post being adapted to have a line attached thereto, and strain operated releasing means normally securing said post at a rearwardly extending angle relative to the plane of the flat body and operating upon application of a sudden strain to said line to entirely release the post for forward swinging movement.

7. A device of the character described, comprising a flat body, a plate forming a rudder disposed on a line running parallel with and between two side edges of the body and occupying a plane perpendicular to the body, means for attaching a hook to said rudder, a post pivotally connected at one end with the body to oscillate in the plane of the rudder, said post being adapted to have a line attached thereto, means for automatically releasing said post upon application of a sudden strain to said line whereby the post may swing to a forwardly directed position, and means for effecting quick submersion of the body, comprising a hook connected in the line in spaced relation with the post and a slot formed in the forward edge of the rudder in which the ring may be loosely engaged.

8. A device of the character described, comprising a flat body, a plate forming a rudder disposed on a line running parallel with and between two side edges of the body and occupying a plane perpendicular to the body, means for attaching a hook to said rudder, a post pivotally connected at one end with the body to oscillate in the plane of the rudder, said post being adapted to have a line attached thereto, means for automatically releasing said post upon application of a sudden strain to said line whereby the post may swing to a forwardly directed position, and means for loosely coupling the line with the rudder whereby a rapid submersion of the body will be effected and the line will be released from the rudder when the body assumes a predetermined position in the water relative to the direction in which the line is extending.

OSCAR KALLBERG.